United States Patent [19]

Allington

[11] 4,438,370
[45] Mar. 20, 1984

[54] LAMP CIRCUIT

[75] Inventor: Robert W. Allington, Lincoln, Nebr.

[73] Assignee: ISCO, Inc., Lincoln, Nebr.

[21] Appl. No.: 240,090

[22] Filed: Mar. 3, 1981

[51] Int. Cl.³ ............................................ H05B 41/36
[52] U.S. Cl. ..................................... 315/106; 315/46;
 315/117; 315/308; 315/DIG. 7
[58] Field of Search ..................... 315/46, 48, 50, 106,
 315/115, 116, 117, 307, 308, 309, DIG. 7

[56] References Cited

U.S. PATENT DOCUMENTS

| | | | |
|---|---|---|---|
| 2,964,692 | 12/1960 | Little | 315/106 X |
| 4,090,106 | 5/1978 | Okumura et al. | 315/307 X |
| 4,283,658 | 8/1981 | Parker | 315/117 |

Primary Examiner—Eugene R. Laroche
Assistant Examiner—Vincent De Luca
Attorney, Agent, or Firm—Vincent L. Carney

[57] ABSTRACT

To prolong the life of a deuterium gas discharge lamp and reduce photometric noise, a DC potential is applied between the cathode and the anode of the lamp to support the arc current through the tube and a separate AC potential is connected across the cathode through an AC amplitude control circuit that controls the amplitude of the AC current. While the cathode is at room temperature, a potential proportional to the AC current through the cathode is balanced against a potential proportional to the AC potential drop across the cathode in an operational amplifier circuit and the output used to operate an indicating device. During operation of the lamp, the output of the operational amplifier circuit is used to control power applied to the cathode through the AC amplitude control circuit. At this time, the proportionality factor for the AC potential drop is divided by a factor to cause an increase in the AC current through the cathode and rebalance the operational amplifier circuit under lamp operating conditions at point where the cathode energy is just above an anomaly in the cathode-power cathode-temperature curve.

79 Claims, 6 Drawing Figures

LAMP CIRCUIT

BACKGROUND OF THE INVENTION

This invention relates to circuits for use with gas discharge lamps such as deuterium lamps of the type used as light sources in ultraviolet spectrophotometers.

In one class of known circuit for gas discharge lamps, the cathode is preheated and then a high potential is applied between the cathode and the anode to break down the gas, after which the high potential is removed and a lower sustaining potential at a regulated current is supplied.

In a prior art circuit of this type, the preheat current through the cathode is reduced or discontinued once the lamp is in operation since the cathode is heated by ion bombardment and by the arc current which passes through it during operation of the lamp. The potential applied to the gas discharge during operation is a low potential, which may be a regulated DC or pulsed current, and it is applied across the anode and the cathode. The reduced preheat current may be regulated DC or unregulated AC. Such circuits are described in the publication "Characteristics and Use of Deuterium Lamps" application RES-0793 published in 1980 by Hamamatsu TV Co. Ltd. with offices at 1126 Ichinocho, Hamamatsu, Japan, and 420 South Avenue, Middlesex, N.J., U.S.A.

These prior art circuits have several disadvantages such as: (1) the tubes they control have a short operating life under some circumstances due to evaporation of the oxide coating on the cathode or sputtering of the cathode from ion collision; and (2) the tubes produce, under some circumstances, excessive photometric noise.

SUMMARY OF THE INVENTION

Accordingly, it is an object of the invention to provide a novel circuit for operating a gas discharge tube.

It is a still further object of this invention to provide a novel circuit and method for extending the life of gas discharge tubes and for reducing photometric noise.

It is a still further object of this invention to provide a circuit which utilizes an AC potential applied to the cathode of a gas discharge tube to extend its life and reduce noise.

It is a still further object of this invention to provide a novel method and circuit for operating a gas discharge tube outside of the cathode sputtering region;

It is a still further object of this invention to provide a novel method and circuit for operating a gas discharge tube near but removed from the anomaly in its cathode-power cathode-temperature characteristic;

It is a still further object of this invention to provide a novel method and circuit for operating a gas discharge tube outside of the cathode-power cathode-temperature hysteresis region;

It is a still further object of this invention to control the operating conditions of the cathode of a gas discharge tube during operation in the arc region by an AC sensing signal in a feedback system to control application of power to the cathode and to move the most negative point over the surface of the cathode;

It is a still further object of this invention to use an AC potential applied to the cathode of a gas discharge tube to control the power added to the cathode by maintaining a ratio of AC potential to AC current during operation of the tube in the arc region which is a controlled multiple such as four times to the same ratio at room temperature before operation.

In accordance with the above and further objects of the invention, a gas discharge tube has its cathode preheated and then a high potential such as 300 to 500 volts applied between the cathode and the anode to break down the gas in the tube, after which the arc is sustained by a lower potential source such as 75 volts. An AC potential is applied across the cathode, with the AC potential being used to increase the operating life of the lamp by controlling power dissipation in the cathode and sweeping the most negative point across the surface of the cathode to preserve the cathode coat.

Advantageously, the AC potential drop across the cathode and the AC current, each multiplied by a proportionality factor, are balanced while the cathode is at room temperature and then the value of the proportionality factor of the current is multipllied or the proportionality factor of the voltage drop is divided by a low multiple such as four. Power is supplied to the cathode until a balance is again reached and maintained by a feedback circuit during operation of the tube in the arc region. The tube is operated outside the sputtering and the cathode-power cathode-temperature hysteresis curve regions.

From the above description, it can be understood that the circuit for controlling the gas discharge lamp of this invention has several advantages such as: (1) it is relatively simple and inexpensive to construct; (2) it is reliable; (3) it extends the life of gas discharge lamps; (4) it provides significant economic advantages, particularly in the case of deuterium lamps which are expensive and subject to early failure; and (5) it reduces photometric noise.

The above noted and other features of the invention will be better understood from the following detailed description when considered with reference to the accompanying drawings in which.

Figure 1:
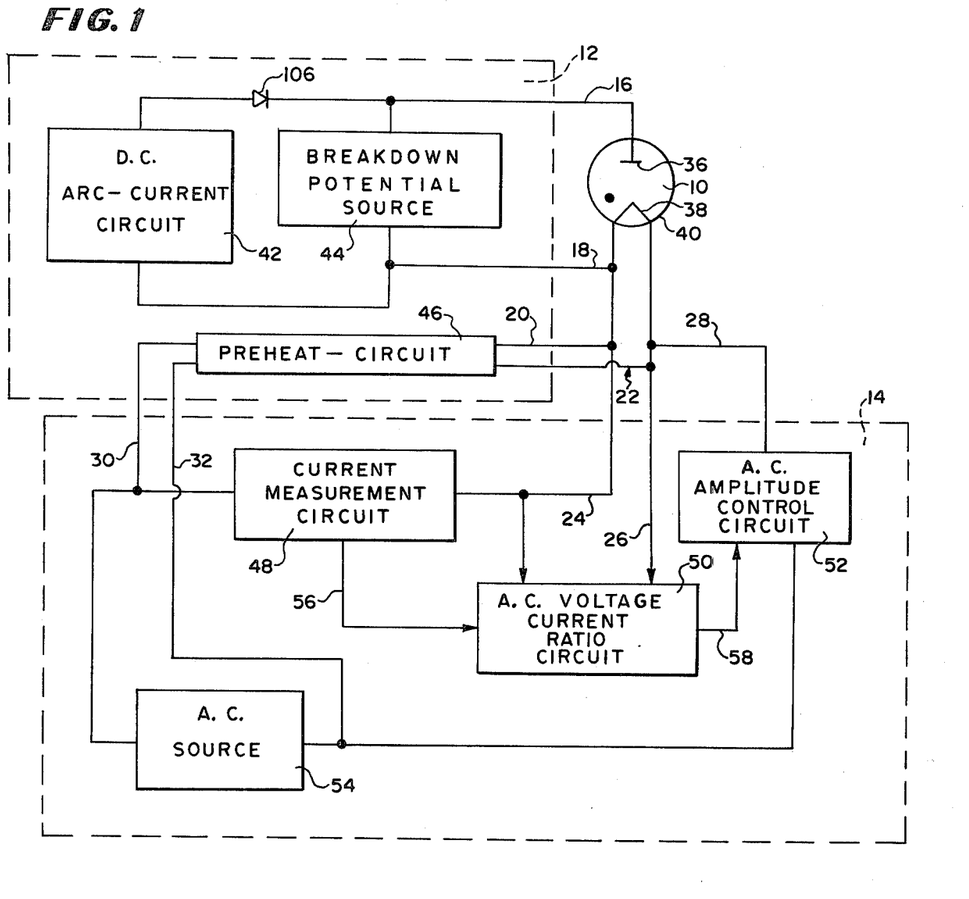
FIG. 1 is a block diagram of an embodiment of the invention.

In FIG. 1, there is shown a deuterium lamp or tube 10 and a circuit for controlling the deuterium lamp 10 which includes a starting-and-running potential circuit 12 and an AC stabilizing circuit 14. The starting-and-running potential circuit 12 is electrically connected to the deuterium lamp 10 by conductors 16, 18, 20 and 22 to provide for preheating of the cathode, starting voltages and running voltages of the deuterium lamp 10. The AC stabilizing circuit 14 is electrically connected: (1) to the deuterium lamp 10 through conductors 24, 26 and 28 to provide a stabilizing AC potential and to sense the AC current and voltage through the cathode 38; and (2) to the starting-and-running potential circuit 12 through conductors 30 and 32 to supply AC power thereto.

The deuterium lamp 10 is a conventional commercial type lamp such as the L1128 sold by Hamamatsu TV Co. Ltd., 420 South Avenue, Middlesex, N.J. 08846 and includes an anode 36 and a cathode 38 within an envelope 40. The envelope 40 is filled with deuterium gas and the tube is designed to operate in the arc region in the manner of deuterium lamps to provide ultraviolet radiation from approximately 190 nanometers to close to 400 nanometers for use in ultraviolet spectrophotometers. It has a direct-heated cathode.

In operation, the starting-and-running potential circuit 12 applies current through the cathode 38 of the deuterium lamp 10 to preheat the cathode 38 to approximately 1000 degrees Kelvin and a breakdown potential of approximately 470 volts is applied between the cathode 38 and the anode 36 to drive the discharge into the arc region. When it is in this region, controlled current at a low potential is applied between the cathode 38 and the anode 36 which is sufficient to maintain the arc.

Before preheating and while the cathode 38 is at approximately 300 degrees Kelvin or room temperature, the AC stabilizing circuit 14 applies an AC potential across the cathode 38. This potential may be used as a substitute for the preheating provided by the starting-and-running potential or to act concurrently with it or separately from it.

During operation of the tube, the cathode 38 is heated by ion bombarment and by the current flowing through the cathode 38 from the anode 36. The AC stabilizing circuit 14 automatically compensates for this effect by adjusting the amount of power applied by it to the cathode 38 and by sweeping the point of most negative potential across the cathode to stabilize and increase the operating life of the deuterium lamp 10 in a manner to be described hereinafter.

The starting-and-running potential circuit 12 includes a DC arc-current circuit 42, a breakdown potential source 44 and a preheat circuit 46. The preheat circuit 46 is electrically connected to one end of the cathode 38 by the conductor 20 and to the other end by the conductor 22 to apply potential through the cathode 38 when used. It is energized through conductors 30 and 32 which are electrically connected to a source of AC potential within the AC stabilizing circuit 14 although it may have other sources of power.

The DC arc-current circuit 42 is electrically connected across or in series with the breakdown potential source 44 to charge capacitors through it. When the cathode 38 is adequately warmed, a switch (not shown in FIG. 1) is closed to discharge the capacitors in the breakdown potential source 44 and apply approximately 470 volts across the anode 36 and the cathode 38 of the deuterium lamp 10 to drive it into the arc region. In the circuit of FIG. 1, a diode 106 prevents the energy from the breakdown potential source 44 from being dissipated by current flow through the DC arc-current circuit 42. The DC arc-current circuit 42 then provides sufficient current within that region.

The AC stabilizing circuit 14 includes a current measurement circuit 48, an AC voltage-current ratio circuit 50, an AC amplitude control circuit 42 and an AC source 54. The current measurement circuit 42 is electrically connected through conductor 24 to one of the sides of the cathode 38 of the deuterium lamp 10 and connected to the AC source 54 to measure current transmitted by the AC source 54 through the cathode 38. It is connected by its output conductor 56 to the AC voltage-current ratio circuit 50.

The AC voltage-current ratio circuit 50 is also connected to conductor 24 and to conductor 26 across opposite sides of the cathode 38 of the tube 10 to receive a measurement of the voltage across the cathode 38. Its output conductor 58 is electrically connected to the AC amplitude control circuit 52 to control that circuit. The AC amplitude control circuit 52 is also in series with the AC source 54 and the cathode 38 to which it is connected by a conductor 28 to control the amplitude of the AC potential which is supplied to the cathode 38. Thus, the AC source 54 is applied directly across the current measurement circuit 58, the cathode 38, and the AC amplitude control circuit 52 in series.

Obviously, the AC amplitude control circuit 52 during adjustment may be used to preheat the cathode 38 and therefore substitute for the preheat circuit 46, which may then be eliminated. Moreover, the AC voltage-current ratio circuit 50 could use a separate constant low-amplitude AC source to apply a sensing AC potential across the cathode 38 and current measurement circuit 48 and control a power source other than the AC source 54 and AC amplitude control circuit 52 to control the power applied to the cathode 38. For example, a source of DC potential could be applied to the cathode 38 and controlled in amplitude by the AC voltage-current ratio circuit 50.

In operation, with the deuterium lamp 10 at substantially room temperature, the AC stabilizing circuit 14 is adjusted so that it supplies an AC potential across the cathode 38 before operation of the tube 10 but limits this potential when the tube 10 is operating hot under stable conditions.

To adjust the AC stabilizing circuit 14, the AC amplitude control circuit 52 is closed by a minute fixed amount to apply a small AC potential from the AC source 54 across the cathode 38 and the current measurement circuit 48. The potential applied at this time is sufficiently low so that it does not heat the cathode above room temperature. The AC potential drop across the cathode 38 is compared to the AC current through the current measurement circuit 48, with each of the potential drop and current being multiplied by a proportionality factor that enables the products to balance each other at room temperature. The ratio of the proportionality factor of the current or the reciprocal of the proportionality factor of voltage drop may be thought of as representing the resistivity of the cathode at room temperature.

After the potential drop and current are balanced, one of the proportionality factors is changed by a factor representing the change in resistivity of the cathode 38 from room temperature to the temperature of optimal operation of the tube, which in the case of most deuterium lamps is a multiple of approximately four.

After the AC voltage-current ratio circuit 50 is so adjusted, it is used to preheat the cathode 38 to operating condition or as a substitute, the preheat circuit 46 raises the temperature of the cathode 38 to a level where breakdown of the deuterium within the envelope 40 is relatively easy to achieve.

After the cathode 38 has been preheated, the proper potential from the breakdown potential source 44 is applied across the cathode 38 and anode 36 to drive the tube 10 into its arc region of operation and current continues to be supplied by the DC arc-current circuit 42 to maintain the tube in this arc condition.

At this time the AC stabilizing circuit 14 controls the amount of power applied to the cathode 38: (1) to compensate for ion collision; and/or (2) to compensate for arc current heating of the cathode; and/or (3) and to prevent sputtering; or (4) to prevent unnecessary vaporization of the oxide coat during operation of the tube 10. This control is accomplished by properly varying, in the preferred embodiment, the amplitude of the AC potential applied through the cathode 38 and causing its most negative point to sweep across the cathode 38 with each half cycle of AC potential to lengthen the operating life of the deuterium tube 10.

Figure 2:
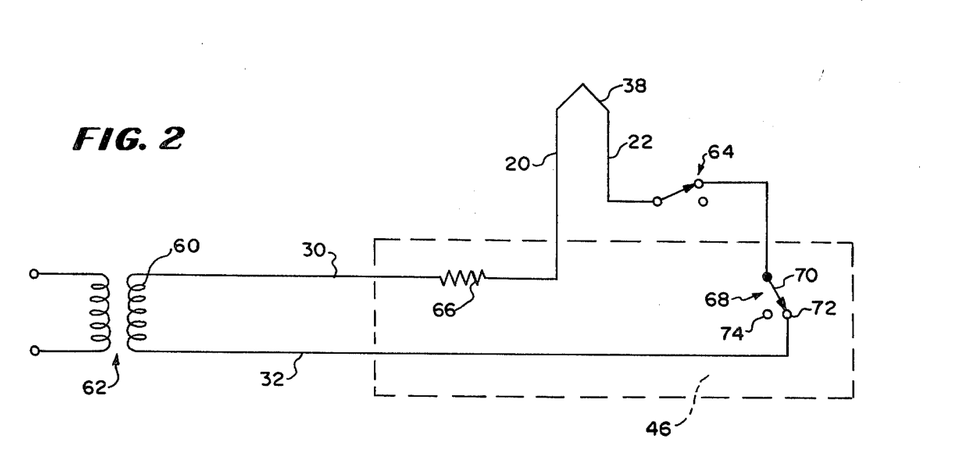
FIG. 2 is a schematic circuit diagram of a portion of the embodiment of FIG. 1.

In FIG. 2, there is shown a schematic circuit diagram of the preheat circuit 46 electrically connected: (1) through conductors 30 and 32 to a secondary winding 60 of a transformer 62 to receive AC potential; and (2) through the conductors 20 and 22 and a single-pole single-throw switch 64 across the cathode 38 of the deuterium lamp 10 (FIG. 1).

The transformer 62 is the power transformer for the deuterium lamp drive circuit and the secondary winding 60 also supplies power to components within the AC stabilizing circuit 14 (FIG. 1) in a manner to be described hereinafter. The single-pole single-throw switch 64 is also in the AC stabilizing circuit 14 as will be described hereinafter in connection with specific components thereof.

The preheat circuit 46 includes a limiting resistor 66 and a single-pole single-throw switch 68, with the limiting resistor 66 being connected in series between the conductors 30 and 32 to limit the current through the cathode 38. This resistor 66 also is part of the current measurement circuit 48 and aids in that measurement in a manner to be described hereinafter.

The single-pole single-throw switch 68 includes a switch arm or armature 70, which when thrown against stationary contact 72 puts the switch in series between the conductors 32 and 22 and the single-pole single-throw switch 64 to complete a circuit through the cathode 38 while the single-pole single-throw switch 64 is closed. It may be thrown to the stationary contact 74 in which case it opens the circuit and the preheat circuit 46 does not supply power to the cathode 38.

As can be readily understood from FIG. 2, the preheat circuit 46 supplies alternating current power to the cathode 38 when the single-pole single-throw switch 68 is thrown against stationary contact 72, either by itself or in conjunction with other circuitry such as the AC stabilizing circuit 14 (FIG. 1). The amount of power is limited by the limiting resistor 66 in the preferred embodiment but other resistors may be used and other preheating techniques may also be used. Preheating is not essential to operation of the tube 10 but reduces wear on the cathode 38 from ion bombardment.

Figure 3:
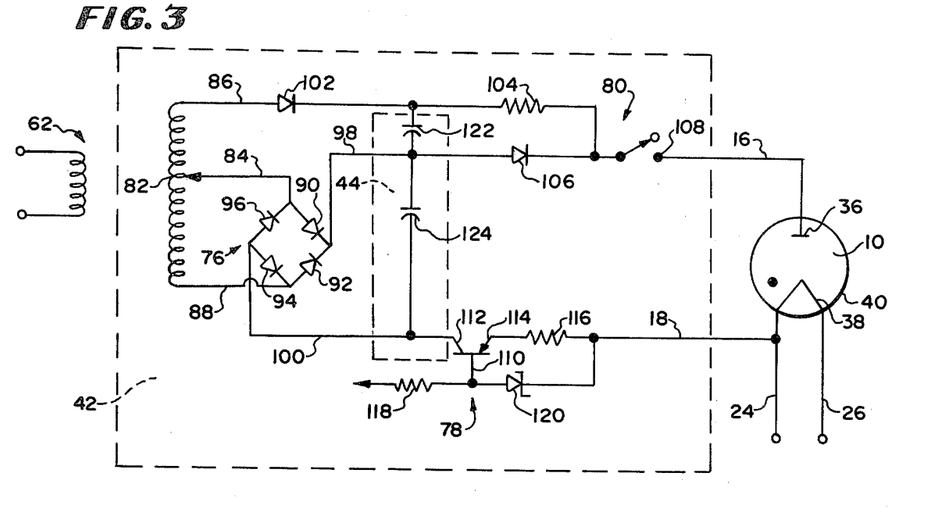
FIG. 3 is a schematic circuit diagram of another portion of the embodiment of FIG. 1.

In FIG. 3, there is shown schematic circuit diagrams of the DC arc-current circuit 42 and the breakdown potential source 44 connected together to provide the breakdown potential and the running potential for the deuterium lamp 10 through conductors 16 and 18 across the anode 36 and cathode 38. These specific circuits are not part of the invention and are provided for information. The circuits described in the above identified manual of Hamamatsu, Application RES-0793 may be preferred under some circumstances.

The DC arc-current circuit 42 includes the transformer 62, a bridge rectifier circuit 76, a transistor circuit 78, and a switch circuit 80, connected together between the primary winding of the transformer 62 and the deuterium tube 10 substantially in the order named. The transformer 62 is the same transformer which has upon it the secondary winding 60 (FIG. 2) that powers the preheat circuit 46 (FIGS. 1 and 2). It includes also a secondary winding 82 having a tap connected to conductor 84, and conductors 86 and 88 at each end to supply the operating potential and the starting breakdown potential for the deuterium lamp 10.

To provide DC potential to the breakdown potential source 44 and the deuterium lamp 10 from the AC on the secondary winding 82, the bridge circuit 76 includes diodes 90, 92, 94 and 96.

To provide DC current to the anode 36 of the deuterium lamp 10, the diode 90 has its anode electrically connected to the tap conductor 84 and to the cathode of diode 96 and has its cathode electrically connected to a conductor 98. The diode 92 has its anode electrically connected to the end conductor 88 and to the cathode of diode 94 and has its cathode electrically connected to the cathode of the diode 90 and to conductor 98.

To provide DC current to the cathode of the deuterium lamp 10, the anodes of diodes 96 and 94 are electrically connected together and to conductor 100 and their cathodes to conductors 84 and 88.

To provide a positive potential to the breakdown potential source 44 and to anode 36, the conductor 86 is electrically connected through the forward resistance of a diode 102 and a limiting resistor 104 and the conductor 98 is electrically connected through the forward resistance of diode 106 to the armature of a switch 80 which is shown open in FIG. 3. One of the fixed contacts 108 of the single-pole single-throw switch 80 is electrically connected to the conductor 16.

To provide current limiting and control, the transistor circuit 78 inclues a PNP transistor having a base 110, a collector 112, and an emitter 114, the emitter 114 being electrically connected to conductor 18 through a current limiting resistor 116 to permit the flow of DC current from the cathode 38 through the transistor and the limiting resistor and back to the rectifier bridge 76. The base 110 is electrically connected to a source of a negative 14 volts with respect to conductor 18 through a resistor 118 and to conductor 18 through the forward resistance of a zener diode 120 for biasing in a manner known in the art.

The breakdown potential source 44 includes first and second capacitors 122 and 124 connected in series between the cathode of diode 102 and the collector 112 of the transistor within transistor circuit 78. One plate of capacitor 122 is electrically connected to one plate of capacitor 124, to conductor 98 leading from a diagonal of the bridge circuit 76, to the armature of the switch 80 through the forward resistance of diode 106, and to one end of resistor 104, so that the capacitor 124 is charged by current from the rectifier bridge and capacitor 122 is charged by current from the rectifier bridge and diode 102.

In operation prior to igniting the deuterium lamp 10, the switch 80 is open. During this time, potential from the secondary winding 82 is rectified by the bridge circuit 76 and the diode 102 to charge the capacitor 122 to approximately 350 volts and to charge the capacitor 124 to approximately 120 volts. After the cathode 38 has been preheated, the switch circuit 80 is closed and the approximately 470 volts which is stored on the capacitors 122 and 124 is placed across the anode 36 and cathode 38 of the deuterium lamp 10 driving the lamp into the arc discharge region.

After the switch 80 is closed, the current flowing through the limiting resistor 104 causes a voltage drop which exceeds the voltage on capacitor 122, thus removing the potential block from diode 102 and enabling it to conduct. When the diode 102 is conducting, the secondary winding together with the diode 102 and rectifier bridge circuit 76 apply most of the driving current to the deuterium lamp 10 through the transistor circuit 78. The transistor circuit 78 serves to stabilize the current level by means of the reference zener diode 120 in a manner known in the art.

Figure 4:
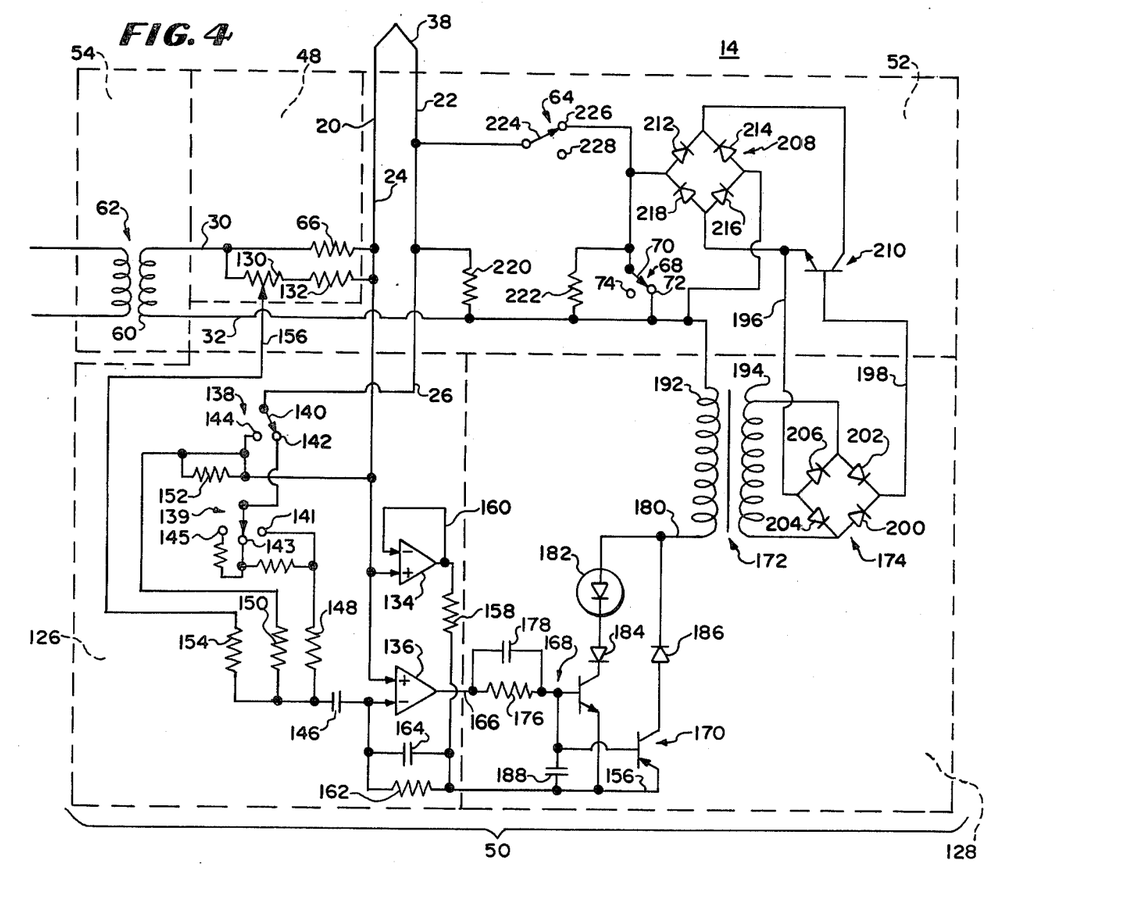
FIG. 4 is a schematic circuit diagram of still another portion of an embodiment of FIG. 1.

In FIG. 4, there is shown a schematic circuit diagram of the AC stabilization circuit 14 having an AC source 54, a current measuring circuit 48, an AC amplitude control circuit 42 and an AC voltage-current ratio circuit shown generally at 50. The AC current measurement circuit 48 measures the AC current through the cathode 38 and the AC voltage-current ratio circuit 50 measures the AC voltage across the cathode 38 from the AC source 54 and determines the ratio of the voltage to current, that ratio being used to control the AC amplitude control circuit 52 to stabilize the operation of the deuterium lamp 10 (FIG. 1).

The AC source 54 includes the secondary winding 60 of the transformer 62 as shown in FIG. 2 for the preheat circuit 46 which it also serves.

The current measurement circuit 48 includes the limiting resistor 66, a potentiometer 130 and a resistor 132. The potentiometer 130 and the resistor 132 are connected in series with each other and in parallel with the resistor 66. The movable tap of the potentiometer 130 is connected to conductor 156 to apply a potential to the AC voltage-current ratio circuit 50. The limiting resistor 66 in addition to providing a potential drop equivalent to the current through the cathode 38, also serves as a current limiting resistor in the preheat circuit 46 as shown in FIG. 2.

The AC voltage-current ratio circuit 50 includes a measuring circuit 126 and an output circuit 128. The measuring circuit 126 includes first and second linear operational amplifiers 134 and 136, a single-pole double-throw switch 138 and a single-pole three position switch 139. The switch 138 may be thrown to an adjust position or to an operate position and the switch 139 may be thrown to any of three positions to adjust the operating point of the lamp 10 (FIG. 1).

When single-pole double-throw switch 138 is in the adjust position, the linear operational amplifiers 134 and 136 compare the potential across the cathode 38 multiplied by a first proportionality factor with the current flowing through the cathode 38 as measured by the current measurement circuit 48 times a second proportionality factor.

When the switch 138 is thrown in the other position, the first proportionality factor is divided by four or the second proportionality factor is multiplied by a factor of four so that the linear operational amplifiers 134 and 136 are thrown out of balance, resulting in a signal that is applied to the output circuit 128 through output conductors 166 and 156 to cause the AC switch 52 to balance the voltage across the cathode 38 and the current with the new proportionality factor.

To obtain measurements of potential drop across the cathode 38 multiplied by a first proportionality factor and current through the cathode 38 multiplied by a second proportionality factor, the single-pole double-throw switch 138 includes an armature 140 and first and second stationary contacts 142 and 144 to measure the potential drop times the first proportionality factor and conductor 156 is electrically connected to potentiometer 130 in the current measurement circuit 48 to measure the cathode current times the second proportionality factor.

To select for comparison with the current measurement on output conductor 156 either the cathode potential drop multiplied by the proportionality factor or the potential drop multiplied by one fourth the proportionality factor, the armature of 140 is electrically connected to conductor 26 to receive the potential applied to one side of the cathode 38 from the AC switch 52: and (1) the first stationary contact 142 is electrically connected to a first plate of a capacitor 146 through switch 139 and a 210K (kilohm) resistor 148; and (2) the second stationary contact 144 is electrically connected to the same first plate of the capacitor 146 through a 52.3K ohm resistor 150. Stationary contact 144 is also electrically connected to the second end of the cathode 38 and the non-inverting input terminal of linear operational amplifier 134 through a 17.3K resistor 152 to prevent relative phase shift between the two positions of armature 140.

To adjust the proportionality factor for individual lamp sputtering points and cathode-power cathode-temperature hysteresis curves, the switch 139 includes a switch arm connected in series with contact 142 of switch 138 and adapted to contact either of three fixed contacts 141, 143 and 145. Contact 141 is directly connected to resistor 148, contact 143 is connected to resistor 148 through a 15K resistor and contact 145 is connected to contact 143 through a 13K resistor to slightly modify the operating temperature of the cathode to operate at 950 K., 1000 K. or 1050 K. degrees respectively depending on the individual tube.

To balance the AC cathode current multiplied by the second proportionality factor against the AC potential drop, the conductor 156 from the current measurement circuit 48 is electrically connected to the first plate of capacitor 146 through a 39.2K resistor 154. The capacitor 146 is a 0.22 microfarad capacitor, the second plate of which is connected to the inverting terminal of the linear operational amplifier 136. It blocks DC components of the cathode potential drop and current so that only the AC components are applied to the inverting terminal of the linear operational amplifier 136. Conductor 24 is also electrically connected to the non-inverting terminal of the linear operational amplifier 136 to provide a reference potential.

To provide a low impedance reference potential for the output circuit 128 between the conductors 156 and 166, the output of linear operational amplifier 134 is connected to output conductor 156 through a 270 ohm resistor 158 and is connected back to its inverting input terminal through a conductor 160. The voltage drop across resistor 158 and emitter current on conductor 156 for transistors 168 and 170 is proportional to changes in the resistivity of the cathode 38 as reflected by changes in the ratio of AC voltage drop to current through the cathode 38. Conductor 156 is electrically connected back to the inverting input of linear operational amplifier 136 through a 22 M (megohm) resistor 162 and to an 82 pf (picofarad) capacitor 164 to provide feedback stability to and limit the bandwidth of the linear operational amplifier 136.

In operation, the potentiometer 130 within the current measuring circuit 48 is adjusted with the deuterium lamp 10 (FIG. 1) being at room temperature and with the single-pole double-throw switch 138 making contact with stationary contact 144 to insert resistor 150 into circuit with the cathode 38 and amplifier 136. This adjustment is made to the point at which the indicating LED (light-emitting diode) in the output circuit 128 just barely lights, which indicates that there is just slightly more than no signal on conductor 166. This LED and its electrical connections will be described hereinafter. This adjustment is to a threshold value so that a decrease in the temperature and resistance of the cathode 38 will result in an increased output signal to output circuit 128.

The single-pole double-throw switch 138 is then moved so that the switch arm 140 makes contact with stationary contact 142 which inserts the resistor 148 between one end of the cathode 38 and the input to linear operational amplifier 136 which has a resistance four times the resistance of the resistor 150. This causes linear operational amplifier 136 to provide an output signal indicating that the AC switch 52 should apply more energy to cathode 38. Switch 139 is positioned to select an operating point outside of the sputtering region or the power-temperature hysteresis curve portion of operation of the cathode in a manner to be described hereinafter in connection with FIG. 5.

As energy is provided to cathode 38 through the AC amplitude control circuit 52 in response to the signal from linear operational amplifier 136, the temperature and resistance of cathode 38 increases and the current through potentiometer 130 increases at a lower rate than the voltage across the cathode, causing a change in the signal to linear operational amplifier 136. This change occurs because the current measurement on potentiometer 130 is in the form of a potential drop in the opposite polarity as the potential drop on cathode 38 when the potential on conductor 24 is a reference. Consequently, the current measurement signal opposes the potential drop across the cathode 38 and a change in current results in a shift of the balance at the plate of capacitor 146 for application to the linear operational amplifier 136. Thus, as the current increases, a new balance is achieved resulting in a lowered input to the linear operational amplifier 136.

When a balance is again achieved at capacitor 146, the signal on conductor 166 from linear operational amplifier 136 rises just enough to turn on the AC control element 52 applying just enough power to the cathode 38 to maintain the cathode temperature at the desired operating point.

While in the preferred embodiment, the cathode's potential drop is divided approximately by four before being applied to capacitor 146 through the use of a resistor 148 which is approximately four times the resistance of the resistor 150, in other lamps the factor could be different. A division of four is used in ordinary deuterium lamps having a tungsten cathode which is directly heated. At a normal room temperature of 300° K., the resistivity of the tungsten wire is 5.65 microhms-centimeter. At the desired operating temperature of approximately 980° K., the resistivity of the lamp heater is around 23 microhms-centimeters, or approximately four times the resistivity at room temperature. The total resistance of the cathode 38 is, of course, proportional to the resistivity and the voltage drop is proportional to the resistance.

Because of the change in resistivity with heat, a resistance measurement may be used to determine the temperature of the cathode 38 and thus control it. It is important to control the cathode 38 temperature because at a temperature which is too low, ion collisions cause sputtering which may destroy the highly-emissive oxide coat of the cathode 38. At temperatures which are too high, the oxide coat may evaporate.

The loss of coat is further reduced by the use of an AC sensing potential since the AC potential causes the most negative point on the cathode to sweep across the cathode each cycle of the AC potential. Since the most negative point is most subject to bombardment by positive ions and to sputtering loss or excessive temperature caused evaporation loss of the alkaline earth oxide coat, the motion of this point across the cathode causes the loss of the oxide coat to be spread over its entire cathode rather than being focused at one point and this prolongs the life of the cathode.

Because it is difficult to measure the resistance of the cathode 38 during operation, it is desirable instead to measure the voltage drop across the cathode 38 and the current through the cathode 38. The quotient of the voltage drop divided by this current is the resistance.

Since current is flowing between the cathode 38 and the anode 36, it is difficult to measure the voltage drop across the cathode 38 and the resistance through the cathode 38. Thus, in the preferred embodiment, alternating current is applied to the cathode 38 and the alternating current component of voltage drop and the alternating current through the cathode 38 are separated from the direct current voltage drop and current flowing between the cathode 38 and the anode 36 for use in measuring the resistance. For convenience, the resulting measurement controls the application of alternating current power though it could just as well control direct current power or any other technique for imparting energy to the deuterium cathode 38.

While the separation of current flowing between the anode 36 and cathode 38 from the AC sensing current flowing through only the cathode in response to the AC potential was made by relying on the difference between AC and DC power, other techniques are available such as using one frequency as a sensing potential through the cathode 38 and another to drive the lamp. Also, if pulsed operation of the lamp arc current were used, the resistance could be sensed between the AC current pulses. Moreover, while the feedback signal in the preferred embodiment that represents temperature relies on the thermal coefficient of resistance of the cathode 38, any other characteristics of the cathode 38 or associated structure that is measurable and related to the temperature of the cathode 38 could be used instead to provide the feedback signal.

The output circuit 128 of the AC voltage-current ratio circuit 50 includes first and second transistors 168 and 170, a transformer 172 and a diode bridge circuit 174. The transistor 168 is a NPN, 2N3704 transistor and the transistor 170 is a PNP, 2N3702 transistor, coupled to provide to the transformer 172 output current only if the AC signal on conductor 166 is of the same relative phase as the AC supply on conductor 32. These signals control the diode bridge circuit 174 in a manner that permits the AC amplitude control circuit 52 to supply alternating current to the cathode 38 representative of the signals on conductor 166.

To receive signals from the measuring circuit 126 applied through output conductor 166, the bases of transistors 168 and 170 are each electrically connected to conductor 166 through a 6.8K resistor 176 and a 0.001 microfarad capacitor 178 connected in parallel.

To apply signals of a first half phase to the transformer 172, a conductor 180 is connected at one end to the transformer 172 and at its other end to the collector of transistor 168 through the forward resistance of a LED (light emitting diode) 182 and the forward resistance of a diode 184 in the order named. The LED is the indicating LED whose indicating purpose was described earlier. The emitter of the transistor 168 is electrically connected to conductor 156.

To apply signal of a second half phase through the transformer 172, the collector of transistor 170 is electrically connected to conductor 180 through the forward resistance of a diode 186 and the emitter of the transistor 170 is electrically connected to the conductor 156. The bases of the transistors 168 and 170 are electrically connected to conductor 156 through a capacitor 188.

Capacitors 178 and 188 provide feedback stability and limit the feedback bandwidth to decrease distortion effects. The diodes 184 and 186 prevent forward collector-junction bias in the transistors 168 and 170. The resistor 176 limits the output current of linear operational amplifier 136 to prevent latchup that could result if transistors 168 and 170 saturate.

To apply successive half-sine wave signals from the transformer 172 for each half phase to the circuit 52, the transformer 172 includes a primary winding 192 and a secondary winding 194, with one end of the primary winding 192 being electrically connected to conductor 180 and the other end to conductor 32 to supply power to the transistors 168 and 170. Thus, when the half-sine wave pulses from the conductor 166 to the base of transistors 170 and 168 respectively coincide in phase with a negative or positive half cycle on the conductor 32 to primary winding 192, either transistor 168 or 170 conducts in its respective direction to cause alternating current to be induced in secondary winding 194.

To provide output consisting of positive half-sine waves to the circuit 52, a first conductor 196 and a second conductor 198 are electrically connected to the bridge circuit 174 and to the circuit 52. To provide positive signals to conductor 198, one end of the secondary winding 194 is connected to conductor 198 through the forward resistance of diode 200 and the other end of the winding is connected to the conductor 198 through the forward resistance of diode 202 of the bridge circuit 174. To provide negative signals to conductor 196, one end of the secondary winding 194 is electrically connected to conductor 196 through the forward resistance of a diode 204 and the other end is electrically connected to conductor 196 through the forward resistance of a diode 206.

To control the application of AC power to the cathode 38, the AC amplitude control circuit 52 includes two single-pole single-throw switches 64 and 68, a diode bridge circuit 208 and a 2N6292 NPN transistor 210. The transistor 210 is controlled by the signals on conductors 196 and 198 and is in circuit with the diode bridge circuit 208 to control the application of power from the transformer 62 across the cathode 38 when the single-pole single-throw switches 64 and 68 are properly positioned. While the AC amplitude control circuit 52 controls AC power from the transformer 62, it could instead control DC power applied to the cathode 38 provided a separate AC source were used to control the signals applied to it in response to the AC voltage-current ratio circuit 50.

To control power applied to the diode bridge circuit 208 in response to signals from conductors 196 and 198, the transistor 210 has its base electrically connected to conductor 198 and its emitter electrically connected to conductor 196. The collector of the transistor is connected to one diagonal of the diode bridge circuit 208 and its emitter is electrically connected to the opposite diagonal to properly bias the transistor 210 with the same timing as each of the pulses transmitted through transformer 194.

To provide AC potential from the transformer 62, through the single-pole single-throw switch 64 and across the cathode 38, the diode bridge circuit 208 includes diodes 212, 214, 216 and 218.

To transmit positive half-way cycles from conductor 30 to conductor 32 through the cathode 38, conductor 30 is electrically connected to conductor 32 through the current measurement circuit 48, cathode 38, switch arm 224 and contact 226 of single-pole single-throw switch 64, the forward resistance of diode 212, the collector of transistor 210, the emitter of transistor 210 and the forward resistance of diode 216 in the order named.

To transmit negative half cycles from conductor 30 to conductor 32 through cathode 38, conductor 32 is connected to conductor 30 through the forward resistance of diode 214, the collector of transistor 210, the emitter of transistor 210, the forward resistance of diode 218, switch 64, the cathode 38, the current measurement circuit 48 and conductor 30. That the resulting AC current through the cathode is proportional to the base current through transistor 210, which in turn is proportional to the current through the primary of transformer 172, which is equal to the current through resistor 158, which is proportional to the temperature error signal developed in the AC voltage-current ratio circuit 50, which is proportional to the deviation of the actual temperature of the lamp cathode 38 from the desired temperature. The feedback system is therefore a linear servo circuit.

The cathode 38 is also connected through conductor 22 and a 560 ohm resistor 220 to conductor 32 and the cathode of diode 218 is electrically connected to conductor 32 through a 47 ohm resistor 22. The resistor 222 takes some of the load off of transistor 210 and prevents heater current from cutting off all together in response to transients that might rise during switching. The resistor 220 sets the current through the cathode 38 during the initial adjustment period during the setting of the potentiometer 130 and prior to the switching of single-pole single-throw switch 138 to stationary contact 142 for operation. During initial adjustment it sets the current to a low level which involves very little heating, so that the cathode remains at substantially room temperature during the adjustment.

To disconnect the AC amplitude control circuit 52 from the cathode 38 during the initial setting of potentiometer 130 and to connect it when it is controlling the power dissipated in the cathode 38 when the deuterium tube 10 (FIG. 1) is operating, the single-pole single-throw switch 64 includes the switch arm 224, a first contact 226 and a second contact 228. The switch arm 224 is electrically connected to conductor 22 and fixed contact 226 is electrically connected to the anode of diode 212, to switch arm 70 and to conductor 32 through the 47 ohm resistor 222. Contact 228 is open and the single-pole single-throw switch 64 is switched into this position while adjusting the potentiometer 130, during which time the resistor 220 controls the current through the cathode 38.

From this description it can be seen that the AC stabilizing circuit 14 adjusts the temperature of the cathode 38 to an operating temperature of approximately 1000 degrees Kelvin by maintaining the cathode resistance at a value during operation approximately four times its value at room temperature. This is accomplished by the AC voltage-current ratio circuit 50 which causes one of the transistors 168 and 170 to conduct when it receives an output pulse from the ratio circuit 50 that is of the same polarity at its base as it receives from the transformer 60 through its corresponding collector diode and thus increases the power applied to the cathode 38 when the temperature of the cathode 38 falls below its set value.

The temperature of the cathode 38 is automatically controlled regardless of variations associated with the arc discharge of the deuterium lamp 10 (FIG. 1) or variation in the mains voltage or other factors. It is adjustable in accordance with the characteristics of different tubes by: (1) potentiometer 130; (2) by the ratio of resistors 150 and 148 resistances; and (3) by the selection through switch 139 of a further series resistance.

In the preferred embodiment, initial adjustment is made from resistivity at room temperature and operating feedback is made from resistivity at the operating temperature in accordance with the ratios of the resistances 148 and 150 but other ratios may be used such as the ratio of the resistances of the cathode 38 between operating temperature and any known temperature midway between operating or room temperature or an arbitrarily set temperature simply by proper adjustment and selection of the resistors as convenience may dictate.

This type of feedback controlled temperature of the cathode 38 is particularly important because of the alkaline earth oxide-coated cathodes used in these deuterium tubes 10 to increase emissivity. These coats are susceptible of being evaporated off of the filimentary type cathodes or being sputtered off by the arc discharge current in use unless the temperature is carefully controlled.

Figure 5:
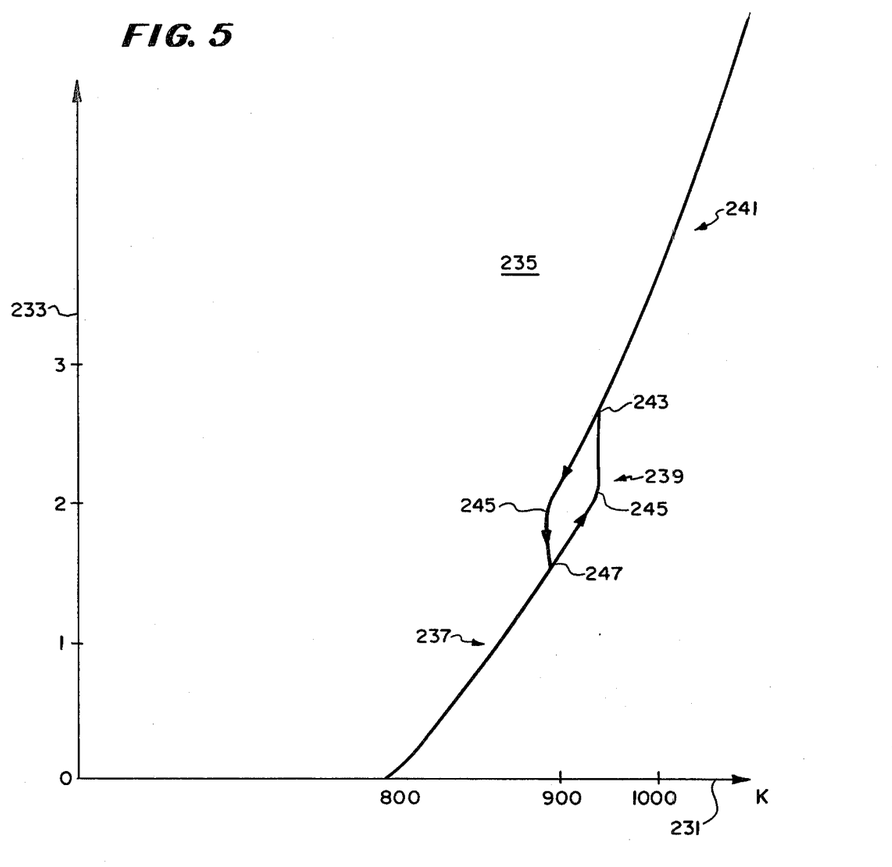
FIG. 5 is a typical cathode-power cathode-temperature curve of a gas discharge lamp used in accordance with an embodiment of the invention.

In FIG. 5, there is shown a typical graph having abscissae 231 of temperature of a cathode in degrees Kelvin and ordinates 233 of power applied to the cathode in watts for a typical deuterium lamp operating with an arc current from anode to cathode of 300 milliamperes.

The curve 235 is prepared by changing settings on resistor 130 (FIG. 4) and recording current through the cathode on conductor 24 and potential drop across the cathode between conductors 24 and 22. These two measurements provide data on power and temperature in accordance with known equations.

From curve 235, it can be understood that there are three regions on the power-temperature curve 235, which are: (1) a first region 237 in which the temperature increases from approximately 900 K. and no power applied to the cathode to approximately 950 K. at approximately two watts applied power; (2) a second region 239 which shows an unexpected anomaly one aspect of which is a hysteresis loop between approximately 950 K. to 965 K.; and (3) a third region 241 from 965 K. to higher temperatures.

In the first region 237 the cathode sputters due to ions impacting upon it. Operation in this region is undesirable because the cathode deteriorates rapidly and there is excessive photometric noise. The ion bombardment of the cathode provides a relatively high level of extra heating.

The second region is unstable and there is excessive photometric noise that makes operation in this region undesirable. Generally, as the temperature increases in this area, sputtering decreases and there is a sudden change or discontinuity from point 247 to point 243 in the curve. The temperature now increases less rapidly because of ions releasing heat less energetically upon collision with the cathode.

The curve 235 follows the laws of heat transfer as the cathode is heated by the applied power. Under these laws the dominant heat loss mechanism in the region of normal operating temperature and surrounding environment of a gas discharge tube is loss by radiation to surrounding objects and is approximately proportional to the difference of the fourth power of the temperature of the cathode and the fourth power of the temperature of the surrounding objects. However, some heat is lost by convection and conduction.

Because the loss of heat follows known laws the cathode-power cathode-temperature curve is relatively smooth except for one anomaly in region 239, which is noticeable from all other deviations. This anomaly takes different shapes in different tubes but it is believed that it is related to a transition from a region in which energy is lost by sputtering to one in which there is substantially no sputtering. This abrupt change in characteristics is referred to herein as the cathode temperature anomaly and the characteristic of the cathode and tube which are illustrated by the cathode-power cathode-temperature is referred to herein as the cathode power temperature characteristic. In addition to showing hysteresis it at times shows a change in the sign of its curve when graphed such as being positive when temperature is increasing and negative when decreasing or no change in temperature while applied power changes.

If the cathode cools at point 243, it follows a path on curve 235 to point 247 and then into the sputtering region at point 247. However, ion collisions in this region cause it to heat again and the cycle repeats. The sputtering along part of the hysteresis loop and the noise created by the cyclic operation makes operation too close to its undesirable.

As the temperature increases in the third region 241, the alkaline oxide coat of the cathode tends to evaporate and shorten the life of the lamp. Consequently, it is desirable to operate in the third region 241 just far enough above the hysteresis loop 239 to prevent dropping into it if the cathode characteristics should change slightly.

It has been found that the curve 235 of commercial lamps differ one from the other, particularly between those made by different manufacturers. Consequently, it is desirable to prepare a power-temperature curve or to otherwise learn of the temperature anomaly at 239 for a lamp and to operate above it. Even if there should be no hysteresis associated with the anomaly, it is still readily identifiable in that the curvature changes sign at least once in the region of the anomaly. The switch 139 in FIG. 4 is intended to permit adjustment to different temperatures just above the hysteresis loop such as at 950 K., 1000 K. and 1050 K. which are desirable temperatures for different lamps.

Figure 6:
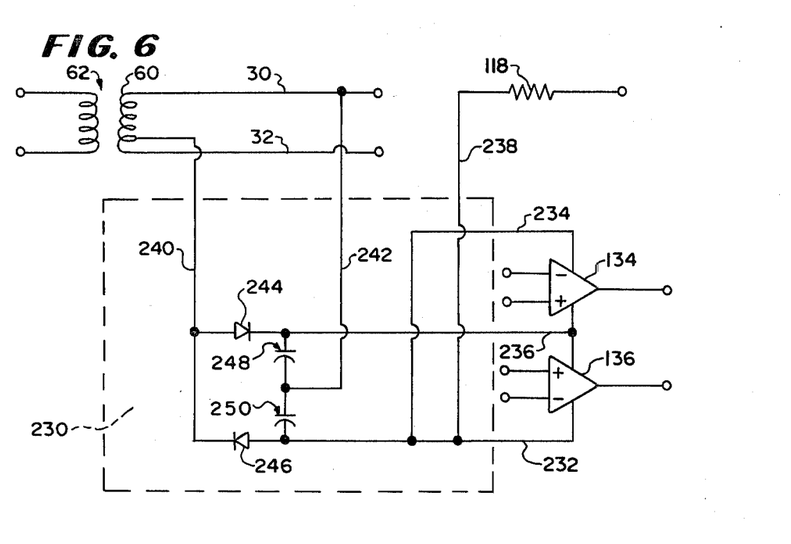
FIG. 6 is a schematic circuit diagram of still another portion of the embodiment of FIG. 1.

In FIG. 6, there is shown a conventional power supply 230 for supplying two linear operational amplifiers 134 and 136 (FIG. 4), with a negative 14 volts DC potential through conductors 232 and 234 and a positive 14 volt potential through conductor 236. It also supplies a negative 14 volt potential through conductor 238 to the DC arc-current circuit 42 (FIG. 3) through conductor 238.

The DC power supply 230 receives alternating current from the secondary winding 60 of the transformer 62 which is also used to apply AC potential through conductors 30 and 32 for use in the preheat circuit 46 and in the AC amplitude control circuit 52 (FIGS. 1, 2 and 4).

To provide a DC potential from the AC potential received from secondary winding 60, the power supply 230 includes a first conductor 240 electrically connected to a tap of the secondary winding 60 and a second conductor 242 electrically connected to conductor 30 at one end of the secondary winding 60. Conductor 240 is electrically connected to positive conductor 236 through the forward resistance of diode 244 and to negative conductors 232, 234 and 238 through the forward resistance of a reversed diode 246. Conductor 242 is electrically connected to the cathode of diode 244 through a first capacitor 248 and to the anode of diode of 246 through a second capacitor 250 for the purpose of filtering.

As can be understood from the above description, the gas tube circuit of this invention has several advantages such as (1) it increases the life of certain gas tubes by sweeping the most negative potential point across a direct emitting cathode uniformly and by reducing the rate of deterioration of the cathode coat by sputtering and evaporation; (2) it is relatively simple and inexpensive; and (3) it has good noise characteristics.

Although a preferred embodiment of the invention has been described with some particularity, many modifications and variations in the preferred embodiment are possible without deviating from the invention. Therefore, it is to be understood that, within the scope of the appended claims, the invention may be practiced other than as specifically described.

What is claimed is:

1. Apparatus comprising:
   an enclosure having at least one envelope portion capable of transmitting light therethrough;
   said enclosure containing gas, an anode and a cathode;
   said cathode and anode being spaced a predetermined distance apart within said container;
   means for establishing potentials between said anode and cathode sufficient to initiate and sustain an arc within said gas, whereby light is emitted by said gas during operation of said apparatus and an anode-cathode current flows between said anode and cathode;
   means for applying an AC potential across said cathode, whereby an AC current flows through said cathode in addition to said anode-cathode current; and
   means for controlling the electrical power applied to said cathode to maintain the AC potential across said cathode at a value that maintains a predetermined relationship between the AC potential drop across said cathode and the AC current through the cathode during the operation of said apparatus.

2. Apparatus according to claim 1 in which:
   said cathode has a power-temperature characteristic with an anomaly; and
   said means for controlling maintains the power applied to the cathode at a level outside of said anomaly.

3. Apparatus according to claim 2 in which said anomaly includes a portion in which the rate of change of the power-temperature characteristic is positive when the temperature is increasing and negative when decreasing.

4. Apparatus according to claim 1 in which:
   said cathode has a sputtering point; and
   said means for controlling includes means for maintaining the power applied to said cathode at a level a predetermined increment higher than the sputtering point.

5. Apparatus according to claim 3 in which:
   said cathode has a cathode-power cathode-temperature hysteresis curve; and
   said means for controlling includes means for maintaining the said cathode at a level sufficient to be outside the cathode-power cathode-temperature hysteresis curve between the sputtering region and none-sputtering region.

6. Apparatus according to claim 2 in which said means for controlling includes means for maintaining the ratio of the AC potential drop across said cathode to AC current through said cathode at a predetermined value during operation of said apparatus.

7. Apparatus according to claim 6 in which said predetermined relationship is proportional to the ratio of an AC potential drop across the cathode to AC current through the cathode at a predetermined temperature lower than the temperature of said cathode during operation of said apparatus.

8. Apparatus according to claim 7 in which said means for controlling said relationship includes means for comparing the AC potential drop across the cathode multiplied by a first proportionality factor with the AC current through the cathode multiplied by a second proportionality factor at room temperature to establish a predetermined relationship and then changing the proportionality factors in such a way as to change the relationship between the AC potential drop multiplied by its proportionality factor to the AC current multiplied by its proportionality factor by a value between 3 and 5.

9. Apparatus according to claim 8 in which said means for comparing includes means for developing a signal related to changes in said relationship and means for applying AC potential to said cathode related to said signal.

10. Apparatus according to claim 9 in which said relationship between the ratio of AC potential and AC current at operating conditions is substantially four times the ratio at room temperature.

11. Apparatus according to claim 10 in which said means for controlling said relationship includes an alternating curent control means.

12. Apparatus according to claim 11 in which said gas is deuterium gas and said envelope, deuterium gas, cathode and anode comprise a deuterium lamp.

13. Apparatus according to claim 1 in which said means for controlling includes means for maintaining the ratio of the AC potential drop across said cathode to AC current through said cathode at a predetermined value during operation of said apparatus.

14. Apparatus according to claim 13 in which said predetermined relationship is proportional to the ratio of AC potential drop across the cathode to AC current through the cathode at a predetermined cathode temperature lower than the temperature of said cathode during operation of said apparatus.

15. Apparatus according to claim 14 in which said:
   means for controlling said relationship includes means for comparing the AC potential drop across the cathode multiplied by a first proportionality factor with the AC current through the cathode multiplied by a second proportionality factor at room temperature to establish a predetermined relationship and then changing the proportionality factors in such a way as to change the relationship between the voltage multiplied by its proportionality factor to current by its proportionality factor by a value between 3 and 5;

said means for comparing includes means for developing a signal related to changes in said relationship and means for applying AC potential to said cathode related to said signal;

said means responsive to said signal is an alternating current means.

16. Apparatus according to claim 15 in which said gas is deuterium gas and said envelope, deuterium gas, cathode and anode comprise a deuterium lamp.

17. Apparatus according to claim 1 in which said means for controlling said relationship includes means for comparing the AC potential drop across cathode multiplied by a first proportionality factor with the AC current through the cathode multiplied by a second proportionality factor at room temperature to establish a predetermined relationship and then changing the proportionality factors in such a way as to change the relationship between the AC potential drop multiplied by its proportinality factor to the AC current multiplied by its proportionality factor by a value between 3 and 5.

18. Apparatus according to claim 17 in which:
said means for comparing includes means for developing a signal related to changes in said relationship and means for applying AC potential to said cathode related to said signal;
said means responsive to said signal is an alternating current means; and
said gas is deuterium gas and said envelope, deuterium gas, cathode and anode comprise a deuterium lamp.

19. Apparatus according to claim 1 in which said gas is deuterium gas and said envelope, deuterium gas, cathode and anode comprise a deuterium lamp.

20. Apparatus comprising:
a deuterium lamp having a cathode and an anode;
said cathode having a high emissivity coat;
means for creating an arc between said anode and said cathode, whereby an arc current flows between said anode and said cathode;
means for applying an AC sensing potential across said cathode, whereby a cathode AC potential drop is created across said cathode and an AC cathode sensing current flows through said cathode;
means for deriving a signal proportional to said AC sensing current through said cathode;
means for deriving a signal proportional to said AC potential drop across said cathode;
means for applying energy to said cathode, whereby the ratio between said AC potential drop and AC sensing current is altered; and
feedback means for controlling the energy applied to said cathode by said means for applying energy in response to said measurements of AC potential drop and AC sensing current through said cathode for maintaining said ratio in a predetermined relationship.

21. Apparatus according to claim 20 in which:

said cathode has a power-temperature characteristic with an anomaly; and
said means for controlling maintains the cathode at a level outside of said anomaly.

22. Apparatus according to claim 20 in which:
said cathode has a sputtering point; and
said feedback means for controlling includes means for maintaining the temperature of said cathode at a level a predetermined increment higher than the sputtering point.

23. Apparatus according to claim 21 in which:
said cathode has a cathode-power cathode-temperature hysteresis curve; and
said means for controlling includes means for maintaining the said cathode at a level outside the cathode-power cathode-temperature hysteresis curve and higher than the sputtering point.

24. Apparatus according to claim 23 in which said means for applying energy includes means for controlling the AC potential applied across said cathode.

25. Apparatus according to claim 24 in which said feedback means includes:
means for balancing the AC components of said potential derived from said AC current against the AC components of said potential proportional to the AC potential drop across said cathode;
means for adjusting said means for balancing so that a predetermined signal is provided by said balancing means when said deuterium lamp is operating with its cathode at an operating temperature that is a predetermined small temperature increment above the sputtering temperature, whereby noise is reduced and the life of the lamp is increased.

26. Apparatus comprising:
a deuterium lamp having a cathode and an anode;
said cathode having a high emissivity coat;
means for creating an arc between said anode and said cathode; whereby an arc current flows between said anode and said cathode;
means for applying an AC sensing potential across said cathode, whereby a cathode AC potential drop is created across said cathode and an AC cathode sensing current flows through said cathode;
means for deriving a signal proportional to said AC sensing current through said cathode;
means for deriving a signal proportional to said AC potential drop across said cathode;
means for applying energy to said cathode, whereby the ratio between said AC potential drop and AC sensing current is altered;
feedback means for controlling the energy applied to said cathode by said means for applying energy in response to said measurements of AC potential drop and AC sensing current through said cathode for maintaining said ratio in a predetermined relationship;
said cathode having a power-temperature characteristic with an anomaly;
said means for controlling maintaining the cathode at a level outside of said anomaly;
said cathode having a cathode-power cathode-temperature hysteresis curve;
said means for controlling includes means for maintaining the said cathode at a level outside the cathode-power cathode-temperature hysteresis curve and higher than the sputtering point;

said means for adjusting including means for selecting a resistance within a range that permits at least selection of one resistance that is more than three times another resistance;

said means for selecting a resistance including means connecting said resistance to one side of said cathode;

said feedback means including at least one linear operational amplifier;

one input of said linear operational amplifier being electrically connected to the other side of said cathode; and said means for connecting said resistance including means for connecting said resistance in circuit with said means for deriving a potential related to said AC current through said cathode and to the other input of said linear operational amplifier.

27. Apparatus according to claim 26 in which said feedback means includes:

a PNP transistor;

a first diode, having its anode electrically connected to the collector of said PNP transistor;

a NPN transistor;

a second diode;

said second diode having its cathode electrically connected to the collector of said NPN transistor;

the output of said linear operational amplifier being connected to the bases of said NPN and PNP transistors;

a transformer;

a source of AC potential having first and second output terminals;

said transformer having first and second windings;

a first of said windings of said transformer being electrically connected at one end to the cathode of said first diode and to the anode of said second diode;

the second end of said first winding being electrically connected to one end of said AC source;

the emitters of said NPN and PNP transistors being electrically connected to the second end of said AC source through said means for obtaining a potential related to said current through said cathode, whereby said means for obtaining a potential controls the amplitude of current through said cathode; and the second winding of said transformer providing said output signal.

28. Apparatus according to claim 27 in which said feedback means includes a lamp electrically connected between said first end of said first winding of said transformer and one of said anode of said first and second diodes, whereby said lamp is illuminated when said second diode conducts.

29. Apparatus comprising:

a deuterium lamp having a cathode and an anode;

said cathode having a high emissivity coat;

means for creating an arc between said anode and said cathode, whereby an arc current flows between said anode and said cathode;

means for applying an AC sensing potential across said cathode, whereby a cathode AC potential drop is created across said cathode and an AC cathode sensing current flows through said cathode;

means for deriving a signal proportional to said AC sensing current through said cathode;

means for deriving a signal porportional to said AC potential drop across said cathode;

means for applying energy to said cathode, whereby the ratio between said AC potential drop and AC sensing circuit is altered;

feedback means for controlling the energy applied to said cathode by said means for applying energy in response to said measurements of AC potential drop and AC sensing current through said cathode for maintaining said ratio in a predetermined relationship;

said cathode having a power-temperature characteristic with an anomaly;

said means for controlling including means for maintaining the cathode at a level outside of said anomaly;

said cathode having a cathode-power cathode-temperature hysteresis curve;

said means for controlling including means for maintaining the said cathode at a level outside the cathode-power cathode-temperature hysteresis curve and above the sputtering point.

said feedback means including means for selecting a resistance within a range that permits at least selection of one resistance that is more than three times another resistance;

said means for selecting a resistance including means connecting said resistance to one side of said cathode;

said feedback means including at least one linear operational amplifier;

one input of said linear operational amplifier being electrically connected to the other side of said cathode;

said means for connecting said resistance including means for connecting said resistance in circuit with said means for deriving a potential related to said AC current through said cathode and to the other input of said linear operational amplifier;

said feedback means including: a PNP transistor; a first diode, having its anode electrically connected to the collector of said PNP transistor; an NPN transistor; a second diode; a transformer; a source of AC potential having first and second output terminals;

said second diode having its cathode electrically connected to the collector of said NPN transistor;

the output of said linear operational amplifier being connected to the bases of said NPN and PNP transistors;

said transformer having first and second windings;

a first of said windings of said transformer being electrically connected at one end to the cathode of said first diode and to the anode of said second diode;

the second end of said first winding being electrically connected to one end of said AC source;

the emitters of said NPN and PNP transistors being electrically connected to the second end of said AC source through said means for obtaining a potential related to said current through said cathode, whereby said means for obtaining a potential controls the amplitude of current through said cathode;

the second winding of said transformer providing said output signal;

said feedback means including a lamp electrically connected between said first end of said first winding of said transformer and one of said anode of said anode of said first and second diodes, whereby said lamp is illuminated when said second diode conducts;

said means for applying energy including first rectifier bridge means and a second rectifier bridge means;

one diagonal of said first rectifier bridge means being electrically connected across the second winding of said transformer;

the other diagonal of said rectifier bridge means being electrically connected to a transistor switch, whereby pulses through said transformer close said transistor switch; and said source of AC power being electrically connected between said transistor switch means and said second rectifier bridge means to permit AC potential to be applied through said transistor switch means and said rectifier bridge to the cathode.

30. Apparatus according to claim 20 in which said means for applying energy includes means for controlling the AC potential applied across said cathode.

31. Apparatus according to claim 30 in which said feedback means includes:

means for balancing the AC components of said AC potential derived from said current against the AC components of said potential proportional to the AC potential drop across said cathode;

means for adjusting said means for balancing so that a predetermined signal is provided by said balancing means when said deuterium lamp is operating with its cathode at an operating temperature that is a predetermined small temperature increment above the sputtering temperature, whereby noise is reduced and the life of said lamp is increased.

32. Apparatus comprising:

a deuterium lamp having a cathode and an anode;
said cathode having a high emissivity coat;
means for creating an arc between said anode and said cathode, whereby an arc current flows between said anode and said cathode;
means for applying an AC sensing potential across said cathode, whereby a cathode AC potential drop is created across said cathode and an AC cathode sensing current flows through said cathode;
means for deriving a signal proportional to said AC sensing current through said cathode;
means for deriving a signal proportional to said AC potential drop across said cathode;
means for applying energy to said cathode, whereby the ratio between said AC potential drop and AC sensing current is altered;
feedback means for controlling the energy applied to said cathode by said means for applying energy in response to said measurements of AC potential drop and AC sensing current through said cathode for maintaining said ratio in a predetermined relationship;
said means for applying energy including means for controlling the AC potential applied across said cathode;
said feedback means including means for balancing the AC components of said AC potential derived from said current against the AC components of said potential proportional to the AC potential drop across said cathode; and means for adjusting said means for balancing so that a predetermined signal is provided by said balancing means when said deuterium lamp is operating with its cathode at an operating temperature that is a predetermined small temperature increment above the sputtering temperature, whereby noise is reduced and the life of said lamp is increased;

said means for adjusting includes means for selecting a resistance within a range that permits at least selection of one resistance that is three times another resistance;

said means for selecting including means for connecting said resistance to one side of said cathode;

said feedback means including at least one linear operational amplifier;

one input of said linear operational amplifier being electrically connected to the other side of said cathode;

said means for connecting said resistance including means for connecting said resistance in circuit with said means for deriving a potential related to said AC current through said cathode and to the other input of said linear operational amplifier;

said balancing means includes a PNP transistor; a first diode, having its anode electrically connected to the collector of said PNP transistor; a NPN transistor; a second diode; a source of AC potential having first and second output terminals; said second diode having its cathode electrically connected to the collector of said NPN transistor; the output of said linear operational amplifier being connected to the bases of said NPN and PNP transistors; and a transformer;

said transformer having first and second windings;

a first of said windings of said transformer being electrically connected at one end to the cathode of said first diode and to the anode of said second diode;

the second end of said first winding being electrically connected to one end of said AC source;

the emitters of said NPN and PNP transistors being electrically connected to the second end of said AC source through said means for obtaining a potential related to said current through said cathode;

the second winding of said transformer providing said output signal;

said means for adjusting includes a lamp electrically connected between said first end of said first winding of said transformer and the anode of said second diode, whereby said lamp is illuminated when said second diode conducts;

said means for applying power includes first and second rectifier bridge means;

one diagonal of said rectifier bridge means being electrically connected across the second winding of said transformer;

the other diagonal of said rectifier bridge means being electrically connected to a transistor switch, whereby pulses through said transformer close said transistor switch; and said source of AC power being electrically connected between said transistor switch means and said rectifier bridge to permit AC potential to be applied through said transistor switch means and said rectifier bridge to the cathode.

33. Apparatus according to claim 20 in which:
said feedback means includes:
means for balancing the AC components of said AC potential derived from said current against the AC components of said potential proportional to the AC potential drop across said cathode; and means for adjusting said means for balancing so that a predetermined signal is provided by said balancing means when said deuterium lamp is operating with its cathode at an operating temperature that is a predetermined small temperature increment above the sputtering temperature, whereby noise is reduced and the life of said lamp is increased.

34. Apparatus comprising:

a deuterium lamp having a cathode and an anode;

said cathode having a high emissivity coat;

means for creating an arc between said anode and said cathode, whereby an arc current flows between said anode and said cathode;

means for applying an AC sensing potential across said cathode, whereby a cathode AC potential drop is created across said cathode and an AC cathode sensing current flows through said cathode;

means for deriving a signal proportional to said AC sensing current through said cathode;

means for deriving a signal proportional to said AC potential drop across said cathode;

means for applying energy to said cathode, whereby the ratio between said AC potential drop and AC sensing current is altered;

feedback means for controlling the energy applied to said cathode by said means for applying energy in response to said measurements of AC potential drop and AC sensing current through said cathode for maintaining said ratio in a predetermined relationship;

said feedback means including means for balancing the AC components of said AC potential derived from said current against the AC components of said potential proportional to the AC potential drop across said cathode; and means for adjusting said means for balancing so that a predetermined signal is provided by said balancing means when said deuterium lamp is operating with its cathode at an operating temperature that is a predetermined small temperature increment above the sputtering temperature, whereby noise is reduced and the life of said lamp is increased;

said means for adjusting including means for selecting a resistance within a range that permits at least selection of one resistance that is three times another resistance;

said means for selecting including means for connecting said resistance to one side of said cathode;

said feedback means including at least one linear operational amplifier;

one input of said linear operational amplifier being electrically connected to the other side of said cathode;

the second winding of said transformer providing said output signal;

said means for adjusting includes a lamp electrically connected between said first end of said first winding of said transformer and the anode of said second diode, whereby said lamp is illuminated when said second diode conducts;

said means for applying power includes first and second rectifier bridge means;

one diagonal of said rectifier bridge means being electrically connected across the second winding of said transformer;

the other diagonal of said rectifier bridge means being electrically connected to a transistor control means whereby pulses through said transformer close said transistor switch; and said source of AC power being electrically connected between said transistor switch means and said rectifier bridge to permit AC potential to be applied through said transistor switch means and said rectifier bridge to the cathode.

35. Apparatus for receiving a gas discharge tube that has a cathode and an anode, comprising:

anode-cathode means for applying a potential between said cathode and anode whereby an anode-cathode current is created between said cathode and said anode;

measuring means for measuring the temperature of said cathode;

cathode means for applying power to said cathode; and feedback means, responsive to said measuring means, for controlling said cathode means to maintain the temperature of said cathode at a predetermined value.

36. Apparatus according to claim 35 in which:

said cathode is subject to physical alternation during operation at certain ranges of temperature; and said means for controlling maintains the temperature of said cathode at a level outside said certain ranges.

37. Apparatus according to claim 36 in which:

said cathode has a cathode-power cathode-temperature hysteresis curve; and said means for controlling maintains the said cathode at a level above the cathode-power cathode-temperature hysteresis curve.

38. Apparatus according to claim 37 in which:

said means for applying power comprises means for applying an AC potential across said cathode whereby a separate AC current flows through said cathode in addition to said cathode-anode current; and said feedback means includes means for deriving a potential related to said separate current and a potential related to the AC potential drop across said cathode.

39. Apparatus according to claim 38 in which said feedback means includes a means for measuring the ratio of said AC voltage drop across said cathode to said separate AC current and maintaining the temperature of said cathode at a value which is a predetermined multiple of said ratio representing the ratio of the resistivity of said cathode at an optimum operating temperature to its resistivity at a lower temperature.

40. Apparatus according to claim 39 in which said lower temperature is room temperature and said operating temperature is approximately 1000 K.

41. Apparatus according to claim 35 in which:

said means for applying power comprises means for applying an AC potential across said cathode whereby a separate AC current flows through said cathode in addition to said cathode-anode current; and said feedback means includes means for deriving a potential related to said separate current and a potential related to the AC potential drop across said cathode.

42. Apparatus according to claim 41 in which said feedback means includes a means for measuring the ratio of said AC voltage drop across said cathode to said separate AC current and maintaining the temperature of said cathode at a value which is a predetermined multiple of said ratio representing the ratio of the resistivity of said cathode at an optimum operating temperature to its resistivity at a lower temperature.

43. Apparatus according to claim 42 in which said lower temperature is room temperature and said operating temperature is approximately 980 K.

44. Apparatus according to claim 35 in which said feedback means includes a means for measuring the ratio of said AC voltage drop across said cathode to said separate AC current and maintaining the temperature of said cathode.

45. Apparatus according to claim 44 in which said lower temperature is room temperature and said operating temperature is approximately 980 K.

46. Apparatus according to claim 35 in which said temperature is approximately 980 K.

47. Apparatus comprising:
   a gas discharge tube having a cathode and an anode;
   means for measuring the resistance of said cathode at first and second temperatures;
   feedback means for applying power to said cathode to maintain its temperature at a preset value in response to said means for measuring said resistance; and
   said feedback means including means for maintaining the ratio of said resistance at said second temperature to said resistance at said first temperature constant.

48. Apparatus according to claim 47 in which:
   said cathode has an anomaly in its cathode-power temperature characteristic; and
   said means for measuring includes means for maintaining the temperature of said cathode at a level a predetermined increment outside said anomaly.

49. Apparatus according to claim 48 in which:
   said cathode has a cathode-power cathode-temperature hysteresis curve; and
   said means for measuring includes means for maintaining the cathode at a temperature above the cathode-power cathode-temperature hysteresis curve.

50. Apparatus for receiving a gas discharge tube that has a cathode and an anode, comprising:
   anode-cathode means for applying a potential between said cathode and anode whereby an anode-cathode current is created between said cathode and said anode;
   measuring means for measuring the condition of said cathode;
   said cathode having an anomaly in its power temperature characteristic;
   means for maintaining the condition of said cathode at a level outside the anomaly.

51. Apparatus for receiving a gas discharge tube that has a cathode and an anode, comprising:
   anode-cathode means for applying a potential between said cathode and anode whereby an anode-cathode current is created between said cathode and said anode;
   measuring means for measuring the condition of said cathode;
   said cathode having a cathode-power cathode-temperature hysteresis curve;
   means for maintaining the said cathode at a temperature above the cathode-power cathode-temperature hysteresis curve.

52. A method for increasing the life of a gas discharge tube comprising the steps of:
   measuring the temperature of the cathode of said gas discharge tube;
   applying a source of power to said cathode to change its temperature;
   controlling the source of power to maintain said temperature at an optimum value;
   the step of controlling the source of power including the step of controlling the source of power to maintain said temperature at a level outside the anomaly in the power temperature characteristic of said cathode.

53. A method according to claim 52 in which the step of controlling the source of power includes the step of controlling the source of power to maintain said temperature at a level which is above the hysteresis curve within the cathode-power cathode-temperature curve.

54. A method according to claim 53 in which said step of measuring the temperature includes the steps of applying an AC signal across said cathode, measuring the AC voltage drop across said cathode and the AC current through said cathode caused by said AC potential and calculating the ratio of said potential to current.

55. A method according to claim 54 in which said step of controlling includes the step of measuring the resistance of the cathode at a first temperature and applying power until the resistance of the cathode equals that at the proper operating temperature.

56. A method according to claim 55 in which the step of controlling includes the steps of:
   measuring the resistance of the cathode at room temperature;
   determining the resistance of the cathode at the optimum operating temperature; and
   measuring the resistance of the cathode during operation of the gas discharge tube to keep it at the resistance calculated for the optimum temperature.

57. A method according to claim 56 in which the step of maintaining the temperature of the cathode includes the step of feeding back a signal representing the measurement of the cathode resistance at the operating temperature and comparing it with a signal representing the calculated optimum temperature based on its ratio with the resistance at room temperature and using the comparison to control the application of power to the cathode.

58. A method for increasing the life of a gas discharge tube comprising the steps of:
   measuring the temperature of the cathode of said gas discharge tube;
   applying a source of power to said cathode to change its temperature;
   controlling the source of power to maintain said temperature at an optimum value;
   the step of controlling the source of power including the step of controlling the source of power to maintain said temperature at a level which is above the hysteresis curve within the cathode-power cathode-temperature curve.

59. A method according to claim 58 in which said step of measuring the temperature includes the steps of applying an AC signal across said cathode, measuring the AC voltage drop across said cathode and the AC current through said cathode caused by said AC potential and calculating the ratio of said potential to current.

60. A method according to claim 59 in which said step of controlling includes the step of measuring the resistance of the cathode at a first temperature and applying power until the resistance of the cathode equals that at the proper operating temperature.

61. A method according to claim 60 in which the step of controlling includes the steps of:
   measuring the resistance of the cathode at room temperature;
   determining the resistance of the cathode at the optimum operating temperature; and
   measuring the resistance of the cathode during operation of the gas discharge tube to keep it at the resistance calculated for the optimum temperature.

62. A method according to claim 61 in which the step of maintaining the temperature of the cathode includes the step of feeding back a signal representing the measurement of the cathode resistance at the operating temperature and comparing it with a signal representing the calculated optimum temperature based on its ratio with the resistance at room temperature and using the comparison to control the application of power to the cathode.

63. A method for increasing the life of a gas discharge tube comprising the steps of:
   measuring the temperature of the cathode of said gas discharge tube;
   applying a source of power to said cathode to change its temperature;
   controlling the source of power to maintain said temperature at an optimum value;
   said step of measuring the temperature including the steps of applying an AC signal across said cathode, measuring the AC voltage drop across said cathode and the AC current through said cathode caused by said AC potential and calculating the ratio of said potential to current.

64. A method according to claim 63 in which said step of controlling includes the step of measuring the resistance of the cathode at a first temperature and applying power until the resistance of the cathode equals that at the proper operating temperature.

65. A method according to claim 64 in which the step of controlling includes the steps of:
   measuring the resistance of the cathode at room temperature;
   determining the resistance of the cathode at the optimum operating temperature; and
   measuring the resistance of the cathode during operation of the gas discharge tube to keep it at the resistance calculated for the optimum temperature.

66. A method according to claim 65 in which the step of maintaining the temperature of the cathode includes the step of feeding back a signal representing the measurement of the cathode resistance at the operating temperature and comparing it with a signal representing the calculated optimum temperature based on its ratio with the resistance at room temperature and using the comparison to control the application of power to the cathode.

67. A method for increasing the life of a gas discharge tube comprising the steps of:
   measuring the temperature of the cathode of said gas discharge tube;
   applying a source of power to said cathode to change its temperature;
   controlling the source of power to maintain said temperature at an optimum value;
   said step of controlling including the step of measuring the resistance of the cathode at a first temperature and applying power until the resistance of the cathode equals that at the power operating temperature.

68. A method according to claim 67 in which the step of controlling includes the steps of:
   measuring the resistance of the cathode at room temperature;
   determining the resistance of the cathode at the optimum operating temperature; and
   measuring the resistance of the cathode during operation of the gas discharge tube to keep it at the resistance calculated for the optimum temperature.

69. A method according to claim 68 in which the step of maintaining the temperature of the cathode includes the step of feeding back a signal representing the measurement of the cathode resistance at the operating temperature and comparing it with a signal representing the calculated optimum temperature based on it ratio with the resistance at room temperature and using the comparison to control the application of power to the cathode.

70. A method for increasing the life of a gas discharge tube comprising the steps of:
   measuring the temperature of the cathode of said gas discharge tube;
   applying a source of power to said cathode to change its temperature;
   controlling the source of power to maintain said temperature at an optimum value;
   the step of controlling including the steps of measuring the resistance of the cathode at room temperature; determining the resistance of the cathode at the optimum operating temperature; and measuring the resistance of the cathode during the operation of the gas discharge tube to keep it at the resistance calculated for the optimum temperature.

71. A method according to claim 70 in which the step of maintaining the temperature of the cathode includes the step of feeding back a signal representing the measurement of the cathode resistance at the operating temperature and comparing it with a signal representing the calculated optimum temperature based on it ratio with the resistance at room temperature and using the comparison to control the application of power to the cathode.

72. A method for increasing the life of a gas discharge tube comprising the steps of:
   measuring the temperature of the cathode of said gas discharge tube;
   applying a source of power to said cathode to change its temperature;
   controlling the source of power to maintain said temperature at an optimum value;
   the step of maintaining the temperature of the cathode including the step of feeding back a signal representing the measurement of the cathode resistance at the operating temperature and comparing it with a signal representing the calculated optimum temperature based on its ratio with the resistance at room temperature and using the comparison to control the application of power to the cathode.

73. A method of operating a gas discharge tube comprising the steps of:
   locating the temperature range of the hysteresis curve of the power-temperature cathode characteristic of the gas discharge tube; and maintaining the temperature of the cathode of the discharge tube at a temperature slightly higher than the hysteresis curve portion of the operation of the gas discharge tube.

74. A method according to claim 73 in which the step of maintaining the temperature includes the step of maintaining the temperature above the sputtering point.

75. A method of increasing the operating life of a gas discharge tube comprising the steps of:
   measuring the temperature of the cathode of said gas discharge tube;
   applying a source of power to said cathode to change its temperature; and
   controlling the source of power to maintain said temperature at a value outside the anomaly in the cathode-power temperature characteristic.

76. A method according to claim 75 in which the step of measuring the temperature includes the steps of applying an AC signal across said cathode, measuring the AC voltage drop across said cathode and the AC current through said cathode caused by said AC potential and calculating the ratio of said potential to current.

77. A method according to claim 76 in which the step of controlling the source of power includes the step of measuring the resistance of the cathode at a first temperature and applying power until the resistance of the cathode equals that of the operating temperature above said hysteresis curve.

78. A method according to claim 77 in which the step of controlling includes the steps of:
   developing a signal representative of the resistance of said cathode at room temperature;
   developing a signal based on the measurement of said resistance of said cathode at its operating temperature;
   comparing said signal representing the potential at room temperature with the signal representing the temperature of the cathode; and
   correcting the temperature of the cathode by applying power thereto intil it is in a predetermined relationship with the resistance of the cathode at room temperature.

79. A method according to claim 75 in which the step of maintaining includes the step of applying an AC potential across said cathode whereby the most negative point of the AC potential moves over the surface of said cathode.

* * * * *